United States Patent [19]
Seidel

[11] Patent Number: 6,161,179
[45] Date of Patent: Dec. 12, 2000

[54] KEY-BASED PROTECTION METHOD FOR LIGHT-READABLE DISCS

[75] Inventor: Robert T. Seidel, West Pittston, Pa.

[73] Assignee: WEA Manufacturing, Inc., Olyphant, Pa.

[21] Appl. No.: 09/034,884

[22] Filed: Mar. 4, 1998

Related U.S. Application Data

[60] Provisional application No. 60/058,074, Sep. 5, 1997.

[51] Int. Cl.[7] .................................................. G06F 1/24
[52] U.S. Cl. ...................... 713/168; 713/182; 713/193; 380/200; 380/232; 380/233
[58] Field of Search ..................... 713/168, 182, 713/193, 200; 380/200, 232, 233, 239

[56] References Cited

U.S. PATENT DOCUMENTS

| | | | |
|---|---|---|---|
| 4,652,698 | 3/1987 | Hale et al. | 380/24 |
| 4,991,208 | 2/1991 | Walker et al. | 380/20 |
| 5,337,357 | 8/1994 | Chou et al. | 380/4 |
| 5,379,433 | 1/1995 | Yamagishi | 713/200 |
| 5,400,403 | 3/1995 | Fahn et al. | 380/21 |
| 5,426,701 | 6/1995 | Herrmann et al. | 380/52 |
| 5,513,169 | 4/1996 | Fite et al. | 369/272 |
| 5,754,649 | 5/1998 | Ryan et al. | 380/4 |
| 5,784,460 | 7/1998 | Blumenthal et al. | 380/4 |

FOREIGN PATENT DOCUMENTS

| | | |
|---|---|---|
| 0 566 492 A1 | 10/1993 | European Pat. Off. . |
| 0 574 219 A2 | 12/1993 | European Pat. Off. . |
| 0 636 962 A2 | 2/1995 | European Pat. Off. . |
| 0 653 695 A2 | 5/1995 | European Pat. Off. . |
| 0 691 762 A2 | 1/1996 | European Pat. Off. . |
| 88/02202 | 3/1988 | WIPO . |
| 94/07204 | 3/1994 | WIPO . |
| WO 94/07204 | 3/1994 | WIPO .............................. G06F 15/21 |
| 95/35533 | 12/1995 | WIPO . |
| WO 95/35533 | 12/1995 | WIPO .............................. G06F 1/00 |
| 96/08756 | 3/1996 | WIPO . |

*Primary Examiner*—Thomas R. Peeso
*Attorney, Agent, or Firm*—Fish & Neave; Robert R. Jackson

[57] ABSTRACT

To protect access to information recorded on a light-readable disc, a light-readable disc player provides the user with a unique key each time the user attempts to play the disc. After the user communicates the unique key to a transaction service and satisfies certain preconditions, such as providing payment or account information, the transaction service provides the user with an unlock key. The user communicates the unlock key to the light-readable disc player, which plays the disc only if the user has provided the correct unlock key.

11 Claims, 7 Drawing Sheets

| UNIQUE CODE | GOVERNING RELATIONSHIP |
|---|---|
| . . . | . . . |
| 1002-894589-733 | $UNIQUE\ KEY - 1278$ |
| 1003-894589-733 | $(UNIQUE\ KEY)^2 - 32$ |
| 1004-894589-733 | $\frac{2}{3} * (UNIQUE\ KEY) + 57$ |
| 1005-894589-733 | $\sqrt{(UNIQUE\ KEY)*37 + 269}$ |
| . . . | . . . |

| UNIQUE KEY | GOVERNING RELATIONSHIP |
|---|---|
| . . . | . . . |
| 1250-1298 | $UNIQUE\ KEY - 654$ |
| 1299-1399 | $\dfrac{UNIQUE\ KEY + 2456}{UNIQUE\ KEY + 1}$ |
| 1400-1600 | $\dfrac{40874}{UNIQUE\ KEY + 31}$ |
| 1600-1607 | $\dfrac{1}{\sqrt[\frac{3}{2}]{(UNIQUE\ KEY)} + 89}$ |
| . . . | . . . |

FIG. 5B

KEY-BASED PROTECTION METHOD FOR LIGHT-READABLE DISCS

This application claims the benefit of United States provisional patent application No. 60/058,074, filed Sep. 5, 1997.

BACKGROUND OF THE INVENTION

This invention relates to methods for protecting access to information stored on light-readable discs, and more particularly to methods for protecting access to information stored on such media as digital versatile disc ("DVD") video ("DVD-Video") discs, DVD read only memory ("DVD-ROM") discs and compact disc read only memory ("CD-ROM") discs.

Light-readable information recording media in the form of discs are well known, as shown, for example, by Kramer U.S. Pat. No. 5,068,846. DVD-Video and DVD-ROM discs are examples of relatively new forms of information recording media. DVD-Video discs generally contain both audio and video data, such as feature-length movies, and are typically used in DVD-Video players for home entertainment. DVD-ROM and CD-ROM discs generally contain computer data, such as software, and are used in computer DVD-ROM and CD-ROM drives, respectively.

Existing DVD-Video players and DVD-ROM and CD-ROM drives generally permit users unlimited access to information stored on light-readable discs. A consumer can purchase a movie stored on a DVD-Video disc and play the movie an unlimited number of times, or can purchase software recorded on a DVD-ROM or CD-ROM disc and install the software an unlimited number of times.

Many consumers, however, do not want to view a movie more than once or twice, and therefore may not want to purchase a movie on a DVD-Video disc that permits unlimited access. Many more consumers, however, may prefer purchasing a DVD-Video disc that permits the user to pay for only the number of times the movie is actually viewed. Movie distributors also seek to offer pay-per-view functionality for movies recorded on DVD-Video discs.

Likewise, software manufacturers typically seek to restrict the number of times a consumer may install software that has been recorded on disc. Such software manufacturers seek a recordable medium that restricts access to the software, but permits the consumer to pay a license fee for each copy of the software that the consumer actually makes. Thus, consumers, movie distributors and software manufacturers desire a method that protects access to information recorded on light-readable discs, and grants access when the consumer satisfies a predetermined condition, such as paying a viewing fee, rental fee, license or equivalent per-use fee.

A recently announced DVD-Video format known as Digital Video Express ("DIVX") proposes a pay-per-view method for DVD-Video discs. DIVX may have some disadvantages, however. Most significantly, DIVX discs will not play on standard DVD-Video players, but instead only will play on more expensive DIVX players. In addition, if a movie is only available in DIVX format, consumers who have already purchased a standard DVD-Video player will be unable to view such movies.

In view of the foregoing, it is an object of this invention to provide a method for protecting information stored on light-readable discs using a format that can be used with existing playback equipment and that does not require the purchase of more costly, specialized hardware.

It is another object of this invention to provide a secure method for protecting information stored on light-readable discs that limits the user's ability to make unauthorized use of the recorded material.

It is a further object of this invention to provide a light-readable disc having information stored in a protected format that can be used with existing playback equipment and that does not require the purchase of more costly, specialized hardware.

SUMMARY OF THE INVENTION

These and other objects of the invention are accomplished according to the principles of the invention by a method that protects access to information, such as a movie, recorded on a light-readable disc, but that grants limited access when the user satisfies certain predetermined conditions. In the preferred embodiment, the method is implemented using a software lock program recorded on the light-readable disc, in cooperation with a user-interactive transaction service.

The light-readable disc includes a software lock program that causes the light-readable disc player to generate and display a random-valued UNIQUE KEY each time the user attempts to play the disc. The user communicates the UNIQUE KEY along with payment or account information to a transaction service, such as a telephone transaction service, internet site, or other similar means. The transaction service verifies the payment or account information, generates an UNLOCK KEY, and communicates the UNLOCK KEY to the user. To generate the UNLOCK KEY, the transaction service uses a GOVERNING RELATIONSHIP, such as a mathematical equation, that has the UNIQUE KEY as one of its variables. Thus, for each UNIQUE KEY, there is a corresponding UNLOCK KEY, as determined by the GOVERNING RELATIONSHIP.

Next, the user communicates the UNLOCK KEY to the light-readable disc player. The lock program then causes the player to determine if the user has provided the correct UNLOCK KEY. The lock program, which includes the GOVERNING RELATIONSHIP, causes the player to evaluate the GOVERNING RELATIONSHIP using the UNIQUE KEY, and compare the result with the user-supplied UNLOCK KEY. The disc player plays the light-readable disc only if the user has provided the correct UNLOCK KEY.

To perform the invented method, the light-readable disc and transaction service use the same GOVERNING RELATIONSHIP. For increased security, a unique GOVERNING RELATIONSHIP is associated with each light-readable disc, and the transaction service determines the GOVERNING RELATIONSHIP by decoding a user-supplied UNIQUE CODE, such as all or part of the disc serial number, associated with each disc. Alternatively, the GOVERNING RELATIONSHIP depends on the value of the UNIQUE KEY, and the transaction service determines the correct GOVERNING RELATIONSHIP by decoding the UNIQUE KEY.

Further features of the invention, its nature and various advantages will be more apparent from the accompanying drawings and the following detailed description of the preferred embodiments.

DETAILED DESCRIPTION OF THE PREFERRED EMBODIMENTS

Figure 1A:
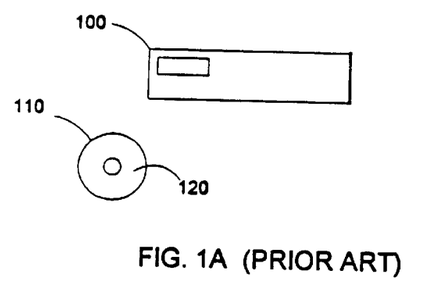
FIG. 1A is a simplified view of a prior art standard DVD-Video player and a prior art DVD-Video disc.

FIG. 1A shows a prior art DVD-Video player 100 ("player 100") and a prior art DVD-Video disc 110 ("disc 110"). Disc 110 contains data 120 stored in a format that may be read by player 100, and that complies with the "DVD Specifications for Read-Only Disc, Part 3—Video Specifications" (referred to as the "DVD-Video Specifications," which is hereby incorporated by reference herein). This explanation of the invention in the context of DVD-Video discs is only illustrative, and it will be understood that the invention is equally applicable to other light-readable information recording media such as DVD-ROM and CD-ROM discs.

Figure 1B:
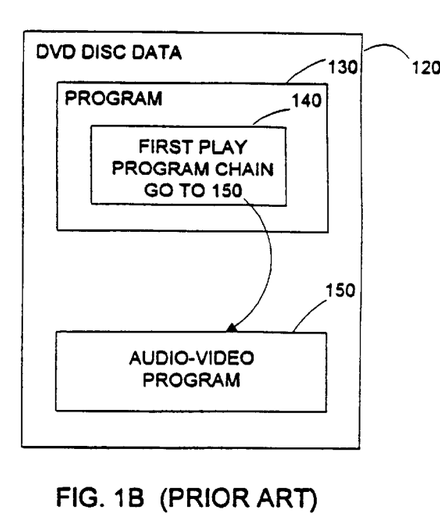
FIG. 1B is a diagrammatic representation of data stored on disc in accordance with the prior art.

For illustrative purposes, data 120 is represented graphically in FIG. 1B. Data 120 may include a software program 130 and a recorded audio-video program 150, such as a movie. Software program 130 may include a first play program chain 140 that controls the initial operation of player 100 immediately after the user inserts disc 110 into player 100. In accordance with the DVD-Video Specifications, player 100 executes first play program chain 140 after disc 110 is inserted into the player. Typically, as shown in FIG. 1B, first play program chain 140 instructs player 100 to begin playing audio-video program 150.

Figure 1C:
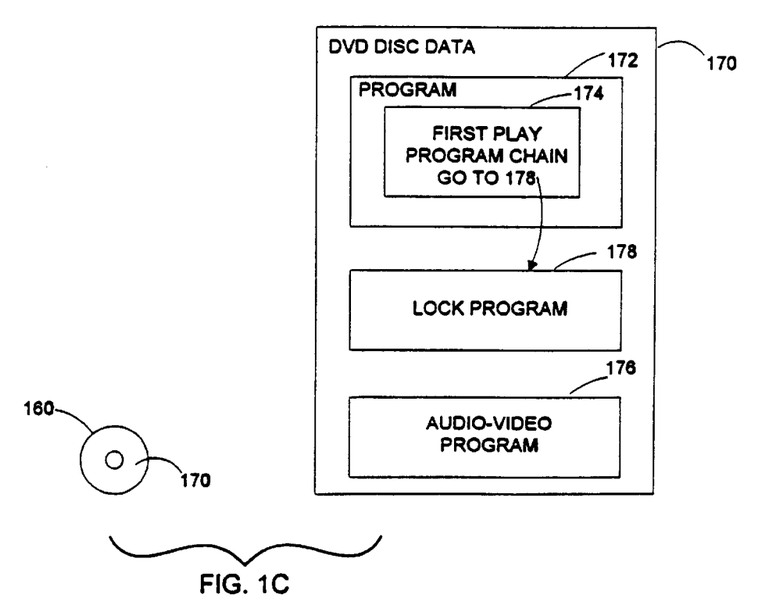
FIG. 1C is a simplified view of a DVD-Video disc recorded with a software program that performs the methods of the present invention, and a diagrammatic representation of the software program.

Alternatively, as shown in FIG. 1C, DVD-Video disc 160 ("disc 160") contains data 170 that implements the methods of the present invention. Like disc 110, disc 160 contains data 170 stored in a format that may be read by player 100, and that complies with the "DVD-Video Specifications." Data 170 includes software program 172, first play program chain 174 and recorded audio-video program 176. Unlike first play program chain 140, first play program chain 174 instructs player 100 to execute a lock program 178 to implement the methods of the present invention. Lock program 178 is read from disc 160 for performance by the player to control access to audio-video program 176.

FIGS. 2–5 show illustrative embodiments of the methods of this invention. The process begins with step 200, in which lock program 178 causes player 100 to generate a UNIQUE KEY using the random number generator function in the player (the DVD-Video Specifications require that conforming DVD-Video players provide a random number generator function). Although "random numbers" are frequently referred to for convenience herein, it will be understood that this phrase includes any suitable random or random-appearing key information, including numbers, letters, symbols, etc. Because the UNIQUE KEY is generated using a random number generator, lock program 178 typically generates a different UNIQUE KEY each time the user attempts to play part or all of disc 160.

Next, in step 210, player 100 displays the UNIQUE KEY using an on-screen menu. In step 220, lock program 178 causes player 100 to prompt the user to provide an UNLOCK KEY. The UNLOCK KEY has a predetermined relationship to the UNIQUE KEY, but the predetermined relationship is typically unknown by the user. The user may obtain the UNLOCK KEY from a transaction service, such as an automated telephone transaction service, according to the methods illustrated in FIGS. 3–5, and described in more detail below.

Figure 2:
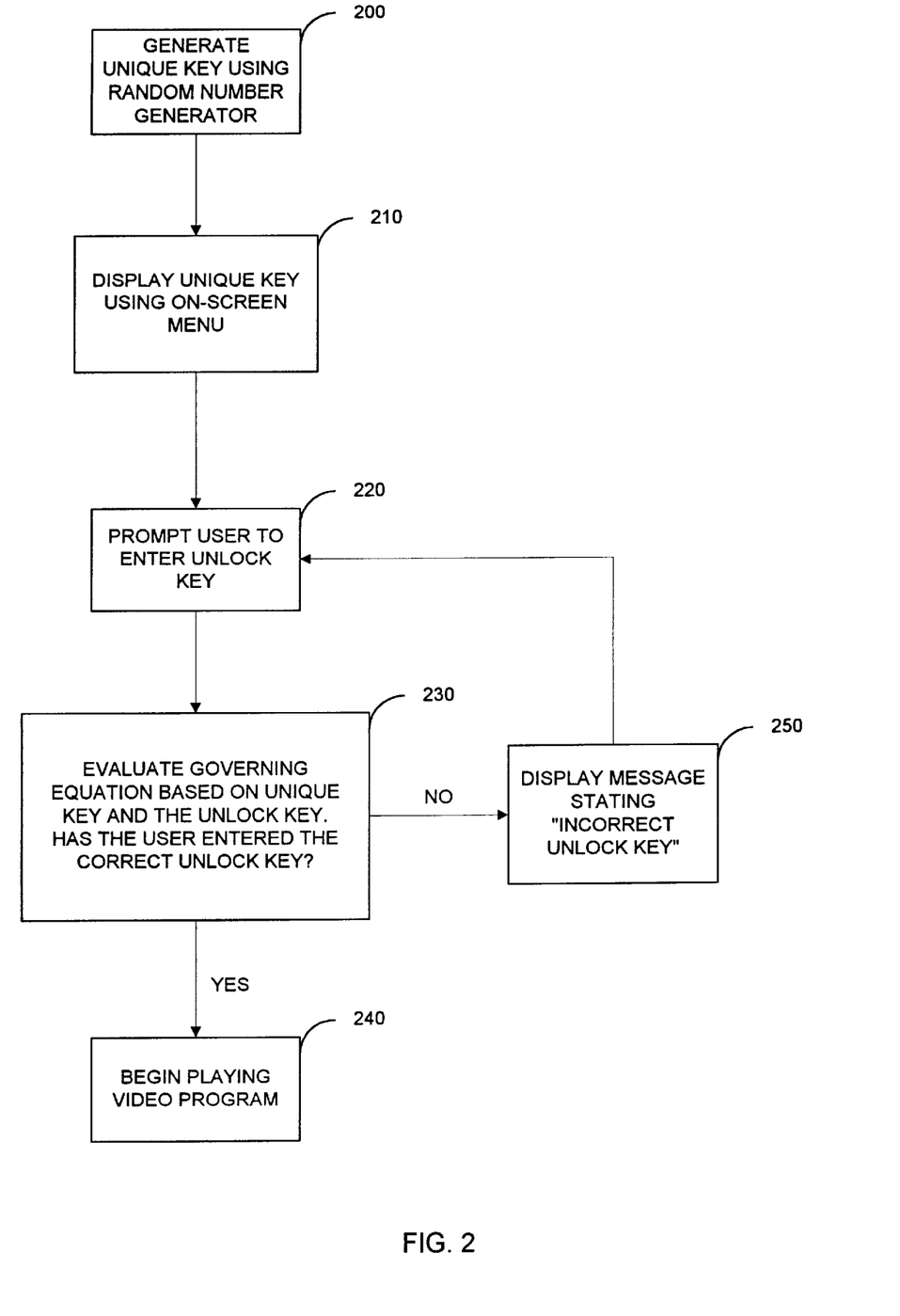
FIG. 2 is a flow chart of an illustrative embodiment of the methods of this invention.

In step 230, after the user obtains the UNLOCK KEY from the transaction service and then provides the UNLOCK KEY to player 100, lock program 178 causes the player to determine if the user has provided the correct UNLOCK KEY by using a GOVERNING RELATIONSHIP (included as part of the lock program) to verify the UNLOCK KEY. As described above, the UNIQUE KEY and UNLOCK KEY have a predetermined relationship, which is described by the GOVERNING RELATIONSHIP. An illustrative example of a GOVERNING RELATIONSHIP is:

$$\text{UNLOCK KEY} = \text{UNIQUE KEY} + 7803 \qquad (1)$$

For example, if UNIQUE KEY=1609, the GOVERNING RELATIONSHIP shown in equation 1 specifies that the UNLOCK KEY=9412. Although equation 1 is a linear algebraic equation, it will be understood that the GOVERNING RELATIONSHIP includes any suitable relationship, including linear equations, non-linear equations, character-mapping codes, etc.

In step 230, lock program 178 causes player 100 to determine the correct UNLOCK KEY by evaluating the GOVERNING RELATIONSHIP using the UNIQUE KEY. If the user-provided UNLOCK KEY matches the value determined by the GOVERNING RELATIONSHIP, lock program 178 performs step 240, which causes player 100 to begin playing audio-video program 176. Thus, in the example described above, the user must provide the UNLOCK KEY value 9412 to view the movie.

If, however, the user-provided UNLOCK KEY does not match the value determined by the GOVERNING RELATIONSHIP, lock program 178 performs step 250, which causes player 100 to display an error message stating that the user provided an incorrect UNLOCK KEY. Thus, in the example described above, if the user provides any UNLOCK KEY value other than 9412, player 100 will not begin playing the movie. Instead, lock program 178 repeats step 220 to cause player 100 to prompt the user to provide a correct UNLOCK KEY. Although not shown in FIG. 2, lock program 178 typically includes a security feature that terminates the program if the user repeatedly provides an incorrect UNLOCK KEY.

Figure 3:
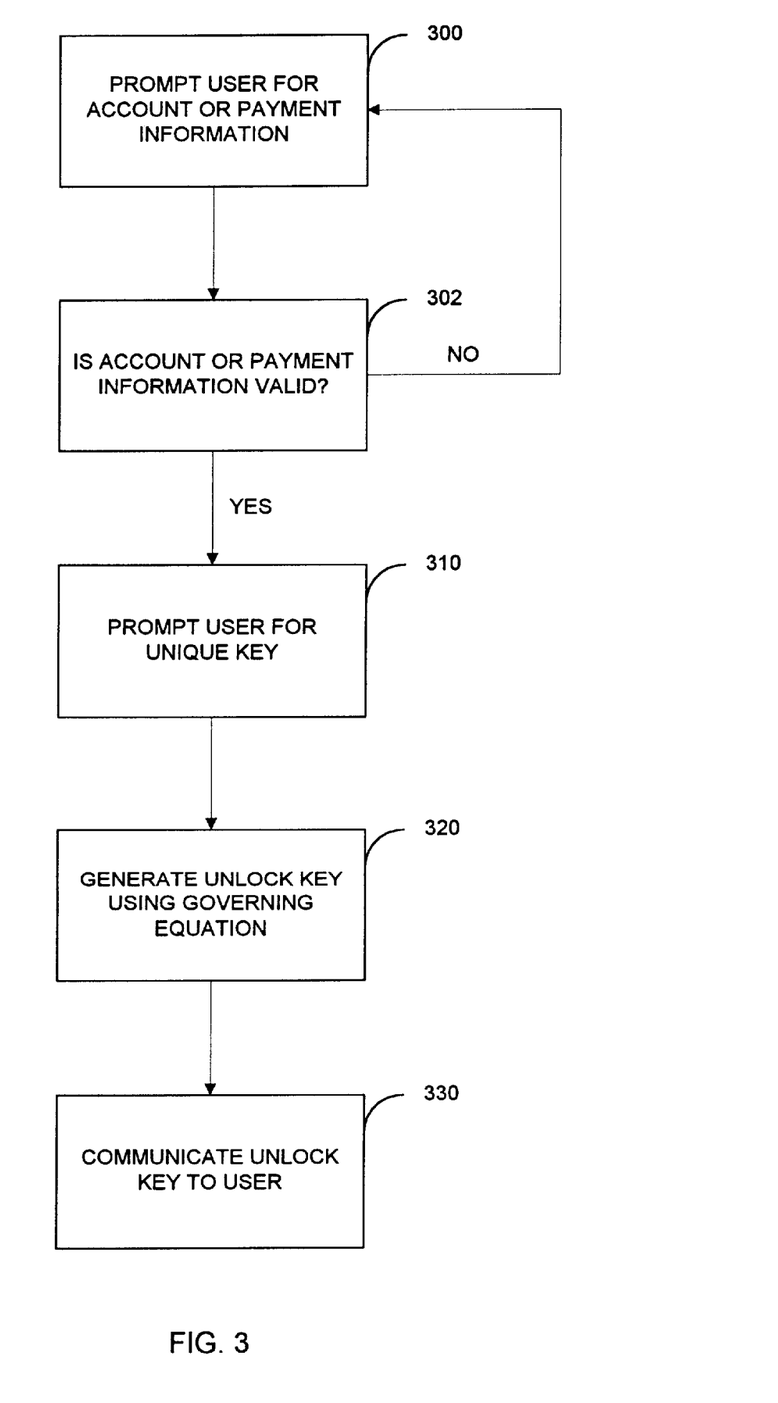
FIG. 3 is a flow chart of an embodiment of the methods of this invention.
Figure 4A:
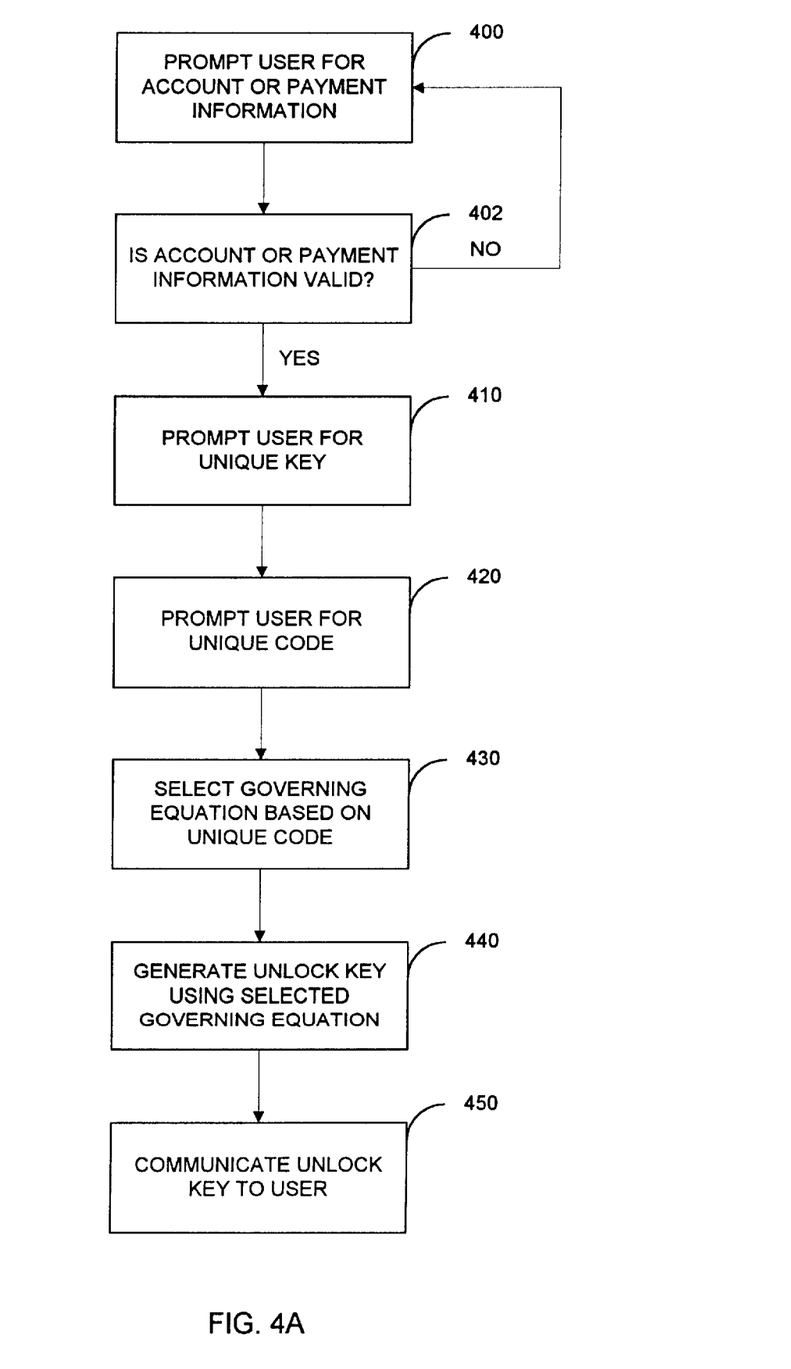
FIG. 4A is a flow chart of a first alternative embodiment of the methods of this invention.
Figure 4B:
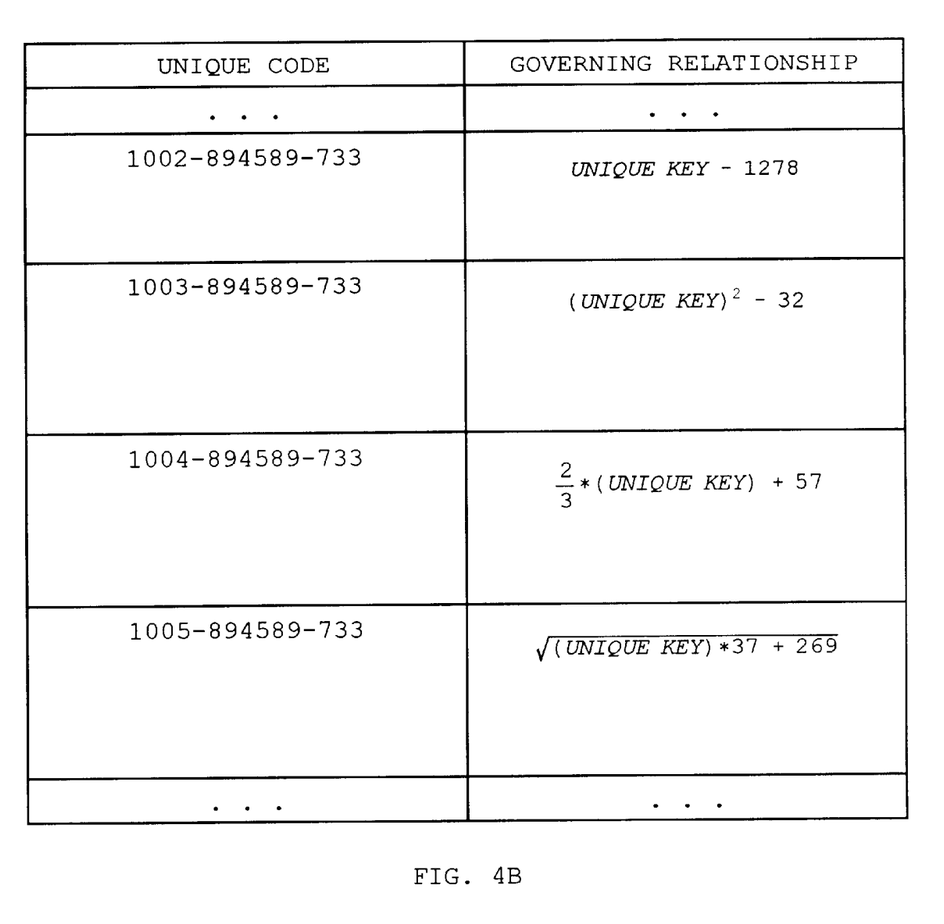
FIG. 4B is a diagrammatic representation of a first alternative embodiment of this invention.
Figure 5A:
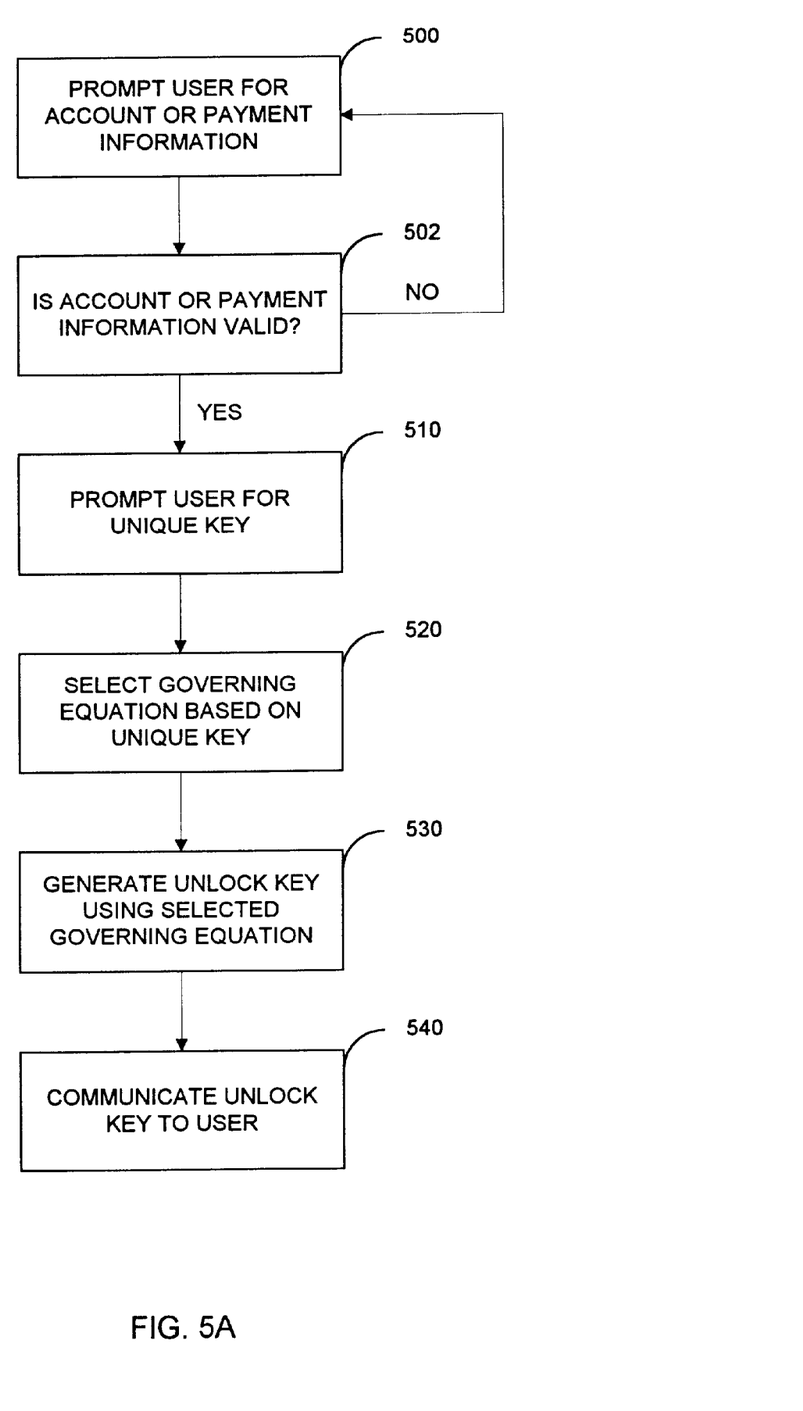
FIG. 5A is a flow chart of a second alternative embodiment of the methods of this invention.
Figure 5B:
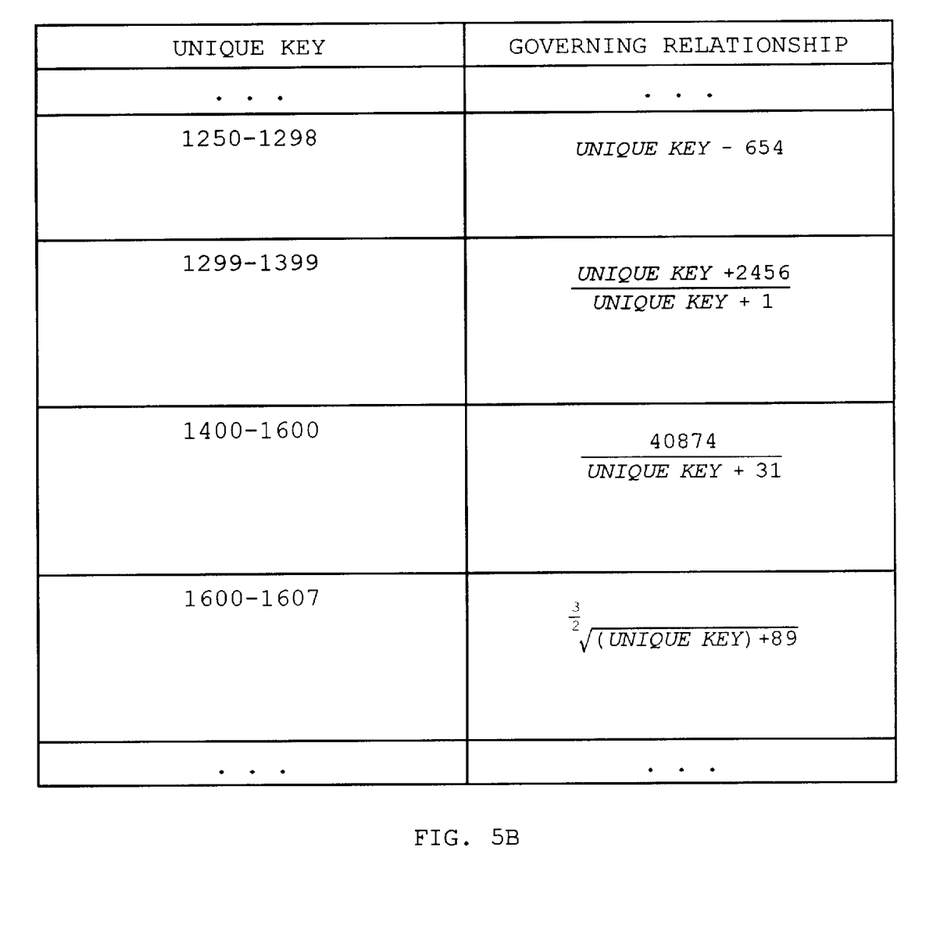
FIG. 5B is a diagrammatic representation of a second alternative embodiment of this invention.

FIGS. 3–5 illustrate embodiments of methods for generating an UNLOCK KEY using a transaction service, such as a live operator or automated telephone transaction service, internet site, or other similar means. In step 300, the transaction service prompts the user for account or payment information. For example, the user may have an account with a video rental store or some other retail establishment. The user may provide her account number, which the retail establishment will use for billing purposes. Alternatively, the user may provide credit or debit card information for payment.

In step 302, the transaction service determines if the user has supplied valid payment information. If the user's account number or credit/debit card number is invalid, the transaction service repeats step 300 to request valid information. Although not shown in FIG. 3, the transaction service typically includes a security feature that terminates the communication if the user repeatedly provides invalid payment information.

If, however, the user provided valid payment information, the transaction service in step 310 prompts the user to provide the UNIQUE KEY. The user may provide the UNIQUE KEY by voice or by a touch-tone keypad, or by any similar means.

Next, in step 320, the transaction service determines the UNLOCK KEY using the GOVERNING RELATIONSHIP and the user-supplied UNIQUE KEY. In the embodiment shown in FIG. 3, the transaction service uses a single GOVERNING RELATIONSHIP, which is the same GOVERNING RELATIONSHIP lock program 178 uses in step 230. In step 330, the transaction service communicates the UNLOCK KEY to the user, such as by audio or video means.

In the method shown in FIG. 3, lock program 178 and the transaction service may use the same GOVERNING RELATIONSHIP for all DVD-Video discs and for all values of UNIQUE KEY. To minimize the ability to unscrupulously decode the UNLOCK KEY, the GOVERNING RELATIONSHIP can be more complicated than the simple equation shown in equation 1.

To provide additional security, each DVD-Video disc may be programmed with a unique GOVERNING RELATIONSHIP (included as part of the lock program on the disc). Alternatively, each DVD-Video disc may be programmed with a plurality of GOVERNING RELATIONSHIPS that depend on the value of the UNIQUE KEY. An illustrative example of such GOVERNING RELATIONSHIPS is:

disc 160. For example, as shown in FIG. 4B, the transaction service may include a table of GOVERNING RELATIONSHIPS indexed by UNIQUE CODE values. The transaction service therefore may determine the correct GOVERNING RELATIONSHIP by locating the table entry corresponding to the UNIQUE CODE that the user specified in step 420. In steps 440 and 450, using the GOVERNING RELATIONSHIP determined in step 430, the transaction service determines and communicates the UNLOCK KEY as in steps 320 and 330, respectively.

Although not shown in FIG. 4A, the transaction service may use the UNIQUE CODE for other purposes, such as tracking a specific disc, determining the popularity of a particular movie, determining the price to charge the user for the movie, accounting for revenue share to a particular software manufacturer, and other similar uses.

Alternatively, a unique GOVERNING RELATIONSHIP may be associated with each value of the UNIQUE KEY. FIG. 5A illustrates a method in accordance with this alternative embodiment of the invention. In steps 500, 502 and 510, the transaction service prompts the user for payment information, verifies payment information and prompts the user for the UNIQUE KEY, as in steps 300, 302 and 310, respectively. In step 520, the transaction service determines the GOVERNING RELATIONSHIP based on the UNIQUE KEY. For example, as shown in FIG. 5B, the transaction service may include a table of GOVERNING RELATIONSHIPS indexed by UNIQUE KEY values. The transaction service therefore may determine the correct GOVERNING RELATIONSHIP by locating the table entry corresponding to the UNIQUE KEY. In steps 530 and 540, using the GOVERNING RELATIONSHIP determined in step 520, the transaction service determines and communicates the UNLOCK KEY as in steps 320 and 330, respectively.

$$\begin{aligned} \text{UNLOCK KEY} &= (\text{UNIQUE KEY})^2 & \text{for} \quad 0 \leq \text{UNIQUE KEY} \leq 255 \\ &= \text{UNIQUE KEY} - 17 & 256 \leq \text{UNIQUE KEY} \leq 1023 \\ &= \frac{\text{UNIQUE KEY}}{2} & \text{UNIQUE KEY} \geq 1024 \end{aligned} \quad (2)$$

Thus, each time lock program 178 randomly selects a UNIQUE KEY, the program uses the GOVERNING RELATIONSHIP associated with the UNIQUE KEY.

In either alternative embodiment, the transaction service and lock program 178 must be synchronized to use the same GOVERNING RELATIONSHIP. FIGS. 4 and 5 illustrate two alternative methods for generating the UNLOCK KEY by synchronizing the GOVERNING RELATIONSHIP used by the transaction service and player 100.

For purposes of the method shown in FIG. 4A, each disc 160 contains a GOVERNING RELATIONSHIP that is uniquely associated with the disc. For example, each DVD-Video disc contains disc-identifying information, such as a serial number, all or part of which may be associated with the particular GOVERNING RELATIONSHIP associated with that disc. In steps 400, 402 and 410, the transaction service prompts the user for payment information, verifies payment information and prompts the user for the UNIQUE KEY, respectively, as in steps 300, 302 and 310.

In step 420, the transaction service prompts the user for the UNIQUE CODE, the disc-identifying information that identifies the user's DVD-Video disc. The disc-identifying information may, for example, be all or part of the serial number printed on the label of disc 160. In step 430, after the user provides the UNIQUE CODE, the transaction service determines the GOVERNING RELATIONSHIP stored on The foregoing only illustrates the principles of this invention. Those skilled in the art can make various modifications without departing from the scope and spirit of the invention. For example, the transaction service steps illustrated in FIGS. 3–5 may be performed using an internet transaction service, or other similar means. Similarly, the invention is equally applicable to other DVD-type or light-readable disc information recording media.

Further, it will be understood that terms like "unique" and "random" as used herein do not necessarily mean absolutely unique or absolutely random values. For example, such values may be selected from a large number of possible values so that the selections appear to be random, even though there might be some repetition or pattern discernible in the selections if very large numbers of selections were observed. For practical purposes, however, the selections can be characterized as unique or random.

The invention claimed is:

1. A method for protecting a user's access to information recorded on a light-readable disc using a light-readable disc player, the method comprising the steps of:

causing the light-readable disc player to generate a first random number each time the user attempts to access the information;

communicating user-supplied qualifying information and the first random number to a transaction service, the transaction service generating a second random number if the qualifying information satisfies predetermined criteria, the second random number having a predetermined relationship to the first random number;

communicating the second random number to the light-readable disc player; and causing the light-readable disc player to verify that the received second random number has the predetermined relationship to the first random number and to play the information only if the received second random number has the predetermined relationship to the first random number.

2. The method of claim 1, wherein the light-readable disc player comprises a random-number function, the random number function generating the first random number.

3. A method for protecting a user's access to information recorded on a light-readable disc using a light-readable disc player, the light-readable disc having disc-identifying information, the method comprising the steps of:

causing the light-readable disc player to generate a first random number each time the user attempts to access the information;

communicating user-supplied qualifying information, the disc-identifying information and the first random number to a transaction service, the transaction service generating a second random number if the qualifying information satisfies predetermined criteria, the second random number having a first predetermined relationship to the first random number, the first predetermined relationship having a second predetermined relationship to the disc-identifying information;

communicating the second random number to the light-readable disc player; and causing the light-readable disc player to verify that the received second random number has the first predetermined relationship to the first random number and to play the information only if the received second random number has the first predetermined relationship to the first random number.

4. The method of claim 3, wherein the light-readable disc player comprises a random-number function, the random number function generating the first random number.

5. A method for protecting a user's access to information recorded on a light-readable disc using a light-readable disc player, the method comprising the steps of:

causing the light-readable disc player to generate a first random number each time the user attempts to access the information;

communicating user-supplied qualifying information and the first random number to a transaction service, the transaction service generating a second random number if the qualifying information satisfies predetermined criteria, the second random number having a first predetermined relationship to the first random number, the first predetermined relationship having a second predetermined relationship to the first random number;

communicating the second random number to the light-readable disc player; and causing the light-readable disc player to verify that the received second random number has the first predetermined relationship to the first random number and to play the information only if the received second random number has the first predetermined relationship to the first random number.

6. The method of claim 5, wherein the light-readable disc player comprises a random-number function, the random number function generating the first random number.

7. A light-readable disc comprising first and second program information that may be retrieved using a light-readable disc player, the first program information causing the light-readable disc player to:

generate a first random number;

display the first random number to a user;

prompt the user for a second number;

generate an unlock number having a predetermined relationship to the first random number; and compare the second number to the unlock number and retrieve the second program information from the light-readable disc only if the second number matches the unlock number.

8. The light-readable disc of claim 7, wherein the disc is a DVD disc.

9. The light-readable disc of claim 8, wherein the disc is a DVD-video disc.

10. The light-readable disc of claim 8, wherein the disc is a DVD-ROM disc.

11. The light-readable disc of claim 7, wherein the disc is a CD-ROM disc.

* * * * *